United States Patent [19]

Bock et al.

[11] Patent Number: 4,553,709
[45] Date of Patent: Nov. 19, 1985

[54] YARN ACCUMULATOR

[75] Inventors: Erich Bock, Wettstetten; Kurt Lovas, Böhmfeld; Johann-Christian Promoli; Joachim Dämmig, both of Ingolstadt, all of Fed. Rep. of Germany

[73] Assignee: Schubert & Salzer, Ingolstadt, Fed. Rep. of Germany

[21] Appl. No.: 541,289

[22] Filed: Oct. 12, 1983

[30] Foreign Application Priority Data

Oct. 16, 1982 [DE] Fed. Rep. of Germany ....... 3238376
Oct. 16, 1982 [DE] Fed. Rep. of Germany ....... 3238375

[51] Int. Cl.$^4$ .................. B65H 51/00; D01H 1/00
[52] U.S. Cl. .................. 242/47.01; 57/58.84; 57/352
[58] Field of Search .......... 242/47.01–47.13, 242/45, 46, 18 DD; 57/58.84–58.95, 263, 352–357

[56] References Cited

U.S. PATENT DOCUMENTS

| 4,132,056 | 1/1979 | Husges et al. ................ 57/263 |
| 4,168,037 | 9/1979 | Grimm et al. ............. 242/18 DD |

FOREIGN PATENT DOCUMENTS

| 2607460 | 9/1976 | Fed. Rep. of Germany . |
| 2553892 | 6/1977 | Fed. Rep. of Germany . |
| 2555802 | 6/1977 | Fed. Rep. of Germany . |
| 2717314 | 11/1978 | Fed. Rep. of Germany . |
| 2102846 | 2/1983 | United Kingdom ............... 57/297 |

*Primary Examiner*—Leonard D. Christian
*Attorney, Agent, or Firm*—Dority & Manning

[57] ABSTRACT

The yarn (31) is fed substantially tangentially from a feed station (30) to the feed end (101) of an accumulator roller (10) of a yarn accumulator (1), drivable by a rotary drive means (120). The yarn is dischargeable from an exit end (103) of this accumulator roller (10) counter to the action of a restraining element (14) through a yarn guide means (4) arranged in prolongation of the axis (122) of the accumulator roller. The restraining element (14) is of radially outwardly open construction and is formed by a yarn restraining ring drivable relative to the accumulator roller (10). The ring includes a radially outwardly open yarn restrainer (141). The yarn guide means (4) consists of two mutually separable yarn guide components (40, 41) and is constructed as a yarn conveyor which deflects the yarn (31) out of a prescribed yarn path (32) into a yarn path intersecting the path of the revolving yarn restrainer (141). In order to measure the yarn length accumulated on the accumulator roller (10), the yarn-revolution monitoring-device (50) and a device (23) to determine the yarn rotation direction are associated with the accumulator roller (10), both of which are associated for control with an impulse counter (5). This impulse counter (5) is switchable from forward counting to backward counting or vice versa as a function of a change in the yarn rotation direction.

43 Claims, 4 Drawing Figures

YARN ACCUMULATOR

BACKGROUND OF THE INVENTION

The present invention relates to a yarn accumulator with a rotary drive means and with an accumulator roller drivable by this rotary drive means, having a feed end to which the yarn is feedable substantially tangentially from a feed station. The accumulator roller includes an exit end from which the yarn is dischargeable counter to the action of a restraining element through a yarn guide means arranged in prolongation of the axis of the accumulator roller.

Such yarn accumulators are known in a wide variety of constructions (German Offenlegungsschriften Nos. 2,555,802 and 2,607,460). In these cases, the yarn is always fed tangentially to the accumulator roller, wraps the latter a plurality of times and leaves the accumulator surface in an axial direction between the accumulator roller and a brake ring placed on the exit end of the latter, for which purpose the yarn must be passed through an annular yarn guide. Such yarn accumulators are used in yarn-processing machines such as various types of knitting machines and weaving looms (German Offenlegungsschrift No. 2,555,802), but also in yarn-producing machines, particularly open-end spinning machines (German Offenlegungsschriften Nos. 2,553,892 and 2,717,314). These known apparatuses have the common disadvantage that the yarn must be threaded in a complicated manner into the brake ring and into the yarn guide. This is time-consuming and demands a stationary arrangement of the yarn accumulator even if an accumulation is only required temporarily.

It is, therefore, an important object of the present invention to produce a yarn accumulator which makes it possible to apply the yarn to the yarn accumulator in a simple manner.

Another object of the invention is to develop the yarn accumulator further so that it can be moved into the yarn path and accumulate the yarn only temporarily without interrupting the yarn path.

Yet another object of the present invention is to produce a device to measure the yarn length accumulated on an accumulator roller which operates with high precision and is of simple construction.

SUMMARY OF THE INVENTION

The above objectives are accomplished according to the invention by providing an accumulator roller having a radially outwardly open drivable yarn restraining element and a yarn guide means which is openable and closeable. Due to the fact that the radially outwardly open restraining element is drivable, a restraining force is always exerted upon the yarn during discharge which prevents the yarn from being discharged from the accumulator roller in an uncontrolled manner. Due to this restraining force, it is possible to design the restraining element radially outwardly open so that a complicated threading-in of the yarn is eliminated. Due to the possibility of opening and closing the yarn guide means, a complicated threading-in is also avoided here. This construction of a restraining element and yarn guide means permits an uninterrupted yarn to be applied to the yarn accumulator for temporary accumulation and subsequently totally released again by the yarn accumulator.

The driven and radially outwardly-open restraining element may be constructed in different ways. According to a mechanically extremely simple embodiment, it consists of an accumulator roller which includes a peripheral surface having a plurality of orifices which lead into an interior of the accumulator roller which is connected to a vacuum source. The vacuum influences the yarn through the orifices in the peripheral surface of the accumulator roller. This causes a counterforce, opposed to the discharge force, to be exerted upon the yarn from the discharge side of the yarn roller preventing the yarn from leaving the accumulator roller in an uncontrolled manner. The orifices are preferably constructed as longitudinal slits which extend substantially along the total accumulation length of the accumulator roller. In this manner, with simple production, the individual yarn turns collected on the accumulator roller can always be satisfactorily restrained on the accumulator roller irrespective of their position.

In order to improve further the restraining effect which the orifices exert with the assistance of the vacuum, it is provided as a further development of the apparatus according to the invention that the restraining element formed by the orifices additionally comprises an annular bead arranged at the exit end of the accumulator roller. Due to the additional deflection of the yarn thereby effected, the latter is subjected to increased friction, so that any uncontrolled discharge of the yarn from the accumulator roller is eliminated, even for a relatively low vacuum within the accumulator roller.

If the yarn accumulator is intended only for a temporary accumulation of a limited yarn supply, the yarn advance plate which is customary in such yarn accumulators may be omitted. Instead of the latter, it may be provided that the accumulator roller is adjustable in the axial direction relative to the yarn supply station and to the yarn guide means. By this means, each new turn is deposited neatly beside the turn previously deposited on the accumulator roller. The advance movement of the yarn accumulator with the accumulator roller—or also of the accumulator roller in the yarn accumulator—can be controlled by the use of means which also transfer the yarn accumulator from a rest position into a working position.

The drive means of the accumulator roller must be variable so that the drive speed of the accumulator roller can be adapted to the tensions of the fed yarn and of the discharged yarn. This can be done, for example, by means of a torque motor. For this purpose, the accumulator roller is preferably drivable through a slip coupling.

According to a preferred embodiment of invention, the restraining element is formed by a yarn restraining ring drivable relative to the accumulator roller. This is instead of an accumular roller having a peripheral surface provided with orifices. This eliminates a specific vacuum connection to the accumulator roller, which also leads to a reduction of the noise generated. In order to reduce the coefficient of friction between yarn and yarn restraining ring, and in order to prolong the useful life of the yarn restraining ring, the latter advantageously consists of plastic.

A charge monitor means, which undertakes the control of peripheral devices in accordance with the conditions which are determined by the application being made, is conveniently associated with the accumulator roller. For example, the drive means of the yarn accumulator may be stopped, or the speed of a following yarn take-up station (for example, bobbin) is increased (see, for example, German Auslegeschrift No. 2,706,018). In the case of the charge monitor means known from the latter, the reflection of the light of a monitoring device constructed as a light barrier is measured, or else a switch is actuated as a function of the quantity of yarn accumulated by pivoting the advance ring, constructed as a switch ring, of the accumulator roller or by releasing a sprung arm due to a reduction of the yarn supply (German Offenlegungsschrift No. 2,558,419). However, such monitoring devices are highly imprecise in operation and only indicate certain zone widths within which the yarn supply moves.

To avoid this disadvantage, according to the invention, a yarn-revolution monitoring device and a device to determine the yarn-revolution direction are provided in association with an impulse counter which is switchable from forward counting to backward counting or vice versa as a function of a change in the yarn-revolution direction, all of which are associated with the accumulator roller. In the case of the discharge speed of the yarn from the accumulator roller, coinciding with the delivery speed of the yarn, the yarn does not revolve on the discharge end of the accumulator roller. When the delivery speed of the yarn to the accumulator roller exceeds the discharge speed of the yarn from the accumulator roller, the yarn revolves in the rotation direction of the accumulator roller. Whereas, when the discharge speed is greater than the delivery speed, the yarn revolves counter to the direction of rotation of the accumulator roller. The number of yarn revolutions, therefore, indicates how much yarn is accumulated on the accumulator roller. For this reason, it is determined by the yarn-revolution monitoring device how often the yarn has passed the monitoring station. The device to determine the yarn-revolution direction of the yarn restraining ring detects whether the yarn supply on the accumulator roller increases or decreases. The impulse counter, therefore, adds or subtracts, as a function of the yarn-revolution direction, the impulses received from the yarn-revolution monitoring device so that the accumulated number of impulses stands in direct relationship to the accumulated yarn supply. This means to measure the yarn length accumulated on the accumulator roller may be applied not only to a yarn accumulator of the type described with radially outwardly open restraining elements, but also in the case of restraining elements constructed in the form of eyes or exhibiting eyes, and therefore possesses independent significance.

In principle, the yarn-revolutions may be measured directly. On the basis of different reflection behavior of the yarn and of the accumulator roller, it can be determined how often the yarn has passed the yarn-revolution monitoring device, while the yarn-revolution direction is determined in customary manner. However, the yarn length accumulated on the accumulator roller can be measured more simply and with far less sensitive elements if the accumulator roller carries a yarn restraining ring drivable variably relative to the accumulator roller for the slip-free guidance of the yarn which yarn restraining ring is sensed at least by the yarn-revolution monitoring device.

The impulse counter is preferably associated for control with the drive means of a discharge device, in order to prevent certain minimum quantities or maximum quantities on the accumulator roller from being negatively or positively exceeded.

The discharge device is conveniently formed by a yarn take-up station arranged after the accumulator roller in the direction of the feed of the yarn. This may be a winding device, but also a yarn processing station, for example, a knitting machine or weaving loom.

If the yarn accumulator is followed by a yarn joining device in order to remedy yarn breakages or in order to eliminate irregularities in the yarn, then the yarn guide means arranged in prolongation of the axis of the accumulator roller is conveniently associated with the accumulator roller and with the yarn joining device conjointly. In this manner, the yarn joining device can be arranged very close behind the yarn accumulator, which results in a compact construction.

As a further development of the subject of the invention, the device to determine the yarn-revolution direction may be formed as a part of a yarn joining device. The device is arranged between the accumulator roller and yarn take-up station and is associated for control with the drive means of the yarn take-up station. As long as the yarn joining device is operating, the yarn must be stationary in its operating region so that the yarn take-up device is stopped. Any additional yarn delivered is, therefore, simply wound on the accumulator roller. When the yarn joining device has completed its operation, it restores the yarn take-up station to service. In the case of a winding device, the yarn take-up speed is generally greater than the delivery speed of a yarn to the accumulator roller because of the tension draft which is necessary in any case, so that the accumulator roller is emptied again. In order that this emptying does not occupy too much time, a speed control means connected to the impulse counter is advantageously provided to control the speed of the yarn take-up station as a function of the yarn length present on the accumulator roller.

In order to eliminate any overcharging of the accumulator roller, the impulse counter may be associated with a stopping device.

In order to further facilitate the start of the accumulation, it is conveniently provided that the accumulator roller exhibits at its exit end a radially outwardly open yarn restrainer.

An embodiment of the subject of the invention has been found extremely advantageously, wherein the accumulator roller is continued beyond its exit end in the form of a tapered conic frustum, on the envelope surface of which the yarn restrainer is arranged. By modifying the orientation of the yarn accumulator to the yarn path, by modifying the distance between the yarn accumulator and the following yarn guide means, or by a relative movement of the yarn restrainer to the conic frustum, the yarn restrainer can be located on a path intersecting the yarn path or removed from the latter. When removed, the yarn accumulator does not obstruct the path of the yarn discharged from the yarn accumulator. The arrangement of the yarn restrainer in the immediate proximity of the major diameter of the conic frustum is particularly advantageous. In this manner, by arranging the yarn accumulator relative to the envelope path so that envelope line and yarn path assume a substantially parallel orientation, the yarn can easily be removed by a yarn restrainer projecting relatively slightly beyond the envelope line of the conic frustum. The taking-up of the yarn can be achieved by a modification of the yarn path or by a modification of the position of the yarn restrainer relative to the yarn path.

The outwardly open yarn restrainer may be constructed or mounted in different ways. According to a convenient embodiment of the subject of the invention, it is mounted sinkably in the accumulator roller, preferably in the peripheral wall of the conic frustum. In this case, the yarn restrainer is advantageously elastically loaded radially inwards, while an axially slidable adjusting cone is provided in the accumulator roller, which can be made to influence the inner end of the yarn restrainer. In order to reduce the friction between adjusting cone and yarn restrainer, the yarn restrainer may in this case be guided, secured against rotation, in the accumulator roller and carry at its inner end a small wheel oriented in the peripheral direction of the accumulator roller for bracing the yarn restrainer against the adjusting cone.

If a yarn restraining ring is adopted as restraining element, then the yarn restrainer is preferably part of this yarn restraining ring drivable relative to the accumulator roller. In order to achieve simple drive means for accumulator roller and yarn restraining ring in this case, they are both advantageously connected, each through a slip coupling, to a common drive shaft. Both the accumulator roller and also the yarn restraining ring each conveniently carry a hysteresis plate, and a permanent magnet is arranged on the common drive shaft between these two hysteresis plates.

As an advantageous further development of the subject of the invention, the yarn restrainer is constructed as a hook which exhibits an open throat in the drive direction. To prolong its useful life, it may be provided that the yarn restrainer carries a ceramic insert in its throat.

If for any reason the yarn accumulator is not required to operate continuously, as is the case, for example, with open-end spinning apparatuses, then the yarn accumulator is located at such a point that the yarn path is not influenced by it in any manner by deflection. In this case, the yarn guide means is conveniently constructed as a yarn conveyor which conveys the yarn out of the prescribed yarn path into a yarn path intersecting the path of the revolving yarn restrainer. The yarn guide means advantageously consists of two mutually separable yarn guide components.

If a thread breakage occurs without the supply of yarn to the yarn accumulator being interrupted, this leads to an overcharging of the yarn accumulator. If the yarn accumulator is merely used for a temporary accumulation of the yarn and then releases the yarn, which thereupon returns into a normal, that is to say undeflected—yarn path, then the yarn becomes temporarily relaxed. For taking up the yarn length additionally delivered or arising by relaxation, the orifice of a suction pipe is arranged in proximity of the yarn path of the yarn fed to the accumulator roller. When such a thread breakage occurs after leaving the yarn accumulator, for example, in the yarn joining device due to failure of the yarn joining process, then, in order to prevent overcharging of the yarn accumulator, a yarn monitor is arranged in the yarn path after the yarn joining device. The yarn monitor is associated with the device to generate and/or deliver the yarn. In order not only to prohibit the additional delivery of the yarn to the yarn accumulator in this case, but also to permit the yarn accumulator to be emptied, the yarn monitor advantageously controls the rotary drive means of the accumulator roller. The rotary drive means is reversible in its direction of rotation.

The yarn accumulator may not be required permanently but only for certain phases of operation. Then, according to the invention, a textile machine is provided with a plurality of work stations and with a maintenance unit which travels past these work stations and which can be associated selectively with these work stations. The accumulator roller and the yarn path can be brought to an acute mutual angle so that the exit end of the accumulator roller is closer than its feed end to the yarn path.

The yarn accumulator constructed according to the invention is extremely versatile. Thus, it can be used, as up until now, while stationary in all known specific applications; for example, not only in weaving looms and various types of knitting machines, but also in open-end spinning apparatuses. The preparation of the work, during which the yarn is brought to the predetermined yarn path, is considerably facilitated in this case, because the yarn can be threaded into the yarn accumulator without the necessity of a free yarn end being available for this purpose. On the contrary, it is possible with the design of the yarn accumulator, according to the invention, to introduce the continuous yarn into the yarn accumulator from the side. This opens up totally new possibilities of use for the yarn accumulator, because such a yarn accumulator can now also be used when it is to be brought only briefly to the work station for a quite specific phase of operation. Outside this phase of operation, therefore, the yarn accumulator can occupy any desired ready position in proximity of the work station or else on a maintenance unit which is required to serve a plurality of identical work stations. Substantial economies of space and material are achieved by this means, particularly if the yarn accumulator is to be applied to machines with a large number of identical work stations; for example, to an open-end spinning machine.

The measuring device, according to the invention, permits a simple and highly precise measurement of the yarn length accumulated on the accumulator roller. The provision can be still further increased if a yarn restraining ring is used, because it is determined substantially by the density of the yarn restrainers of the yarn restraining ring (or marks on the latter). In this case, this yarn restraining ring may, as desired, exhibit either closed or also radially outwardly open yarn restrainers. In the latter case the accumulator roller can be moved into a closed yarn path or also out of the latter again. The time of the control processes associated therewith can be determined with high precision by virtue of the precise knowledge of the yarn supply accumulated at any time.

Such a device for measuring the amount of yarn on the accumulator roller has the advantage that it operates independently of the yarn speed, of the yarn thickness, of the rotary speeds at the yarn accumulator and of the dimensions of the yarn accumulator. This also applies irrespective of the accumulation period. The degree of charge of the yarn accumulator is determined solely by the difference of the yarn-revolutions in the two directions.

BRIEF DESCRIPTION OF THE DRAWINGS

The invention is explained more fully below with reference to drawings, in which only those elements absolutely necessary to the understanding of the invention are illustrated.

DETAILED DESCRIPTION OF A PREFERRED EMBODIMENT

Figure 1:
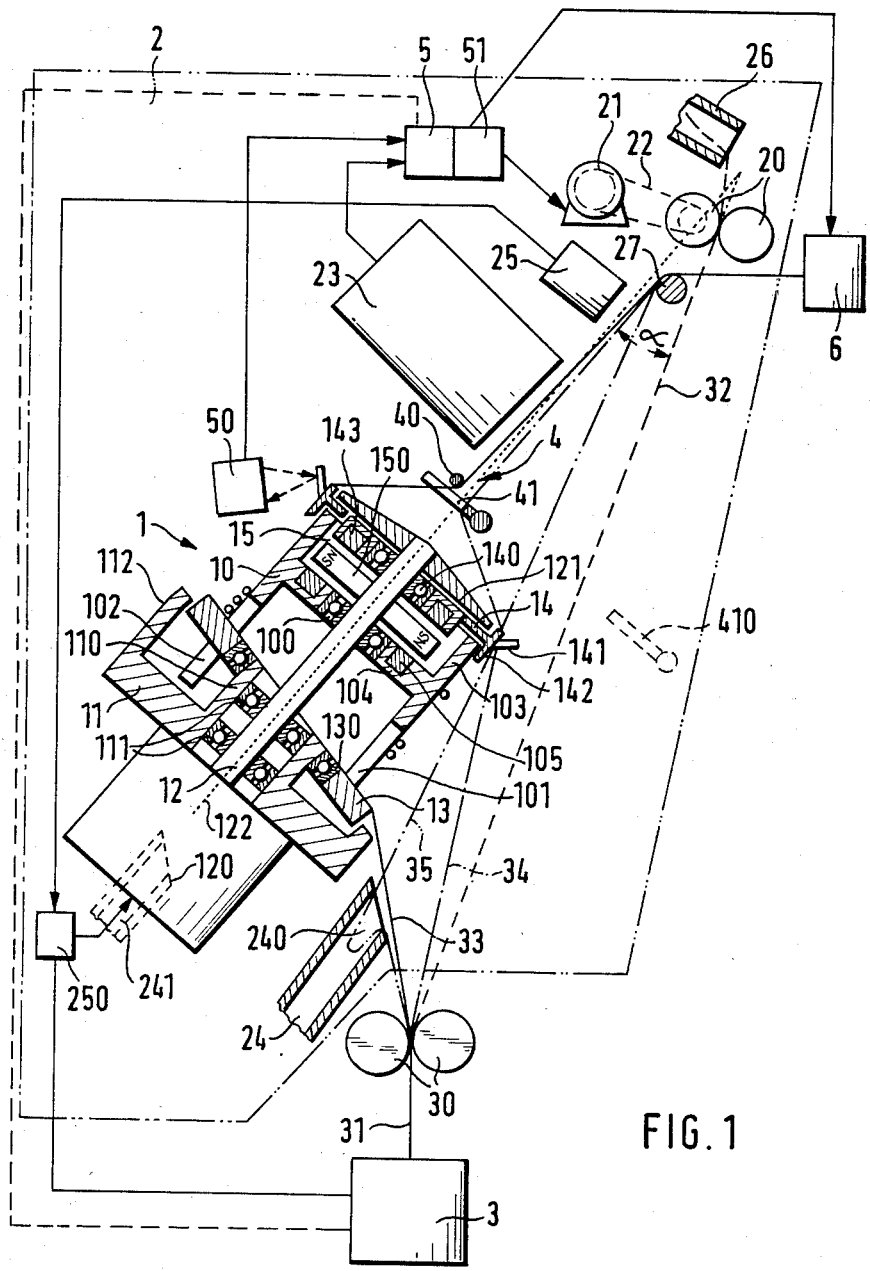
FIG. 1 is a view which illustrates a first embodiment of a yarn accumulator constructed according to the invention in section as utilized in an open-end spinning machine with a yarn joining device, illustrated only diagrammatically.
Figure 4:
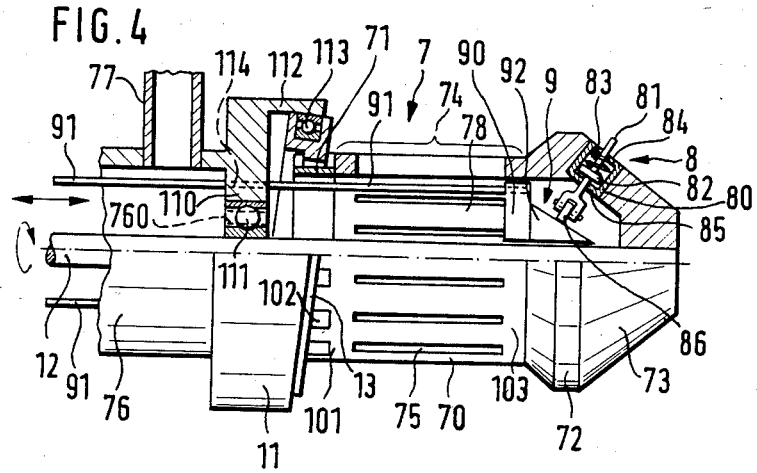
FIG. 4 is a view which illustrates another embodiment of the yarn accumulator according to the invention with the yarn accumulator being illustrated in cross-section in the top half of the figure, and in elevational view in the bottom half.

The yarn accumulator 1, which is illustrated in FIGS. 1 and 4, may in principle be used on all textile machines on which yarn accumulators 1 with an accumulator roller 10 are employed, for example, on various types of knitting machines or also on weaving looms. However, since the working conditions on an open-end spinning machine are even more difficult compared to the above-mentioned machines, particularly if the yarn accumulator 1 is required to be arranged on a traveling maintenance unit 2, the construction and the function of the yarn accumulator 1 are explained below by way of the example of an open-end spinning machine.

Of such an open-end spinning machine, only the spinning apparatus 3 indicated by a block, a discharge roller pair 30 and a winding device 6 are illustrated in FIG. 1. A yarn 31 generated in the spinning apparatus 3 is discharged out of the spinning apparatus 3 by means of the discharge roller pair 30 and is then fed to the winding device 6, where the yarn 31 is wound onto a tube to form a bobbin.

The maintenance unit 2, which is transportable along the open-end spinning machine and can thus serve a plurality of spinning stations of this machine consecutively, is brought for the purpose of this service, in known manner, into the yarn path between the discharge roller pair 30 and the yarn take-up station constructed as a winding device 6. A drive device (not shown) controllable from the maintenance unit 2 is associated with the winding device 6 in this case. The maintenance unit 2 also has, in the exemplary embodiment illustrated, an auxiliary discharge roller pair 20 which is driven from a motor 21 through a belt 22. The maintenance unit 2 has, consecutively in the yarn travel direction, outside the yarn path 32 defined between the discharge roller pair 30 of the open-end spinning machine and the auxiliary discharge roller pair 20 of the maintenance unit 2, the yarn accumulator 1 already mentioned and a yarn joining device 23. The yarn joining device may be constructed in various ways, for example, as a knotting device.

The yarn accumulator 1 shown in FIG. 1 has a base 11, by means of which it is mounted rigidly on the maintenance unit 2, or pivotably on a lever or linkage. The base 11, in turn, has a hub 110, in which a drive shaft 12 is mounted through one or more bearings 111. The accumulator roller 10 already mentioned is mounted on the shaft 12 by means of a bearing 100, and exhibits entraining slots 102 at its feed end 101 facing the base 11. A yarn advance plate 13, which is in toothed engagement with these entraining slots 102, is mounted rotatably on the hub 110 of the base 11 by means of a bearing 130, and is therefore carried along by the accumulator roller 10 when the latter rotates. The yarn advance plate 13 is inclined in a known manner relative to the axis 122, formed by the drive shaft 12, of the accumulator roller 10 in order to effect the required yarn advance.

The base 11 exhibits a cylindrical envelope 112 which partly envelops the yarn advance plate 13 at its circumference, but which on the other hand still allows it to project beyond the end face of the envelope 112 by such a distance that it can exert the required advancing effect upon the yarn.

A rotary drive means 120, which is connected to the shaft 12, is constructed as a motor according to FIG. 1, but other drive means—for example, gears which are driven by other driven elements—may also be adopted. This rotary drive means 120 is supported by the base 11 of the yarn accumulator 1. The drive shaft 12 carries at its free end an end plate 121, which turns conjointly at equal speed with the shaft 120.

A restraining element constructed as a yarn restraining ring 14 is mounted rotatably on the shaft 12 by means of a bearing 140 between the end plate 121 and the accumulator roller 10. The yarn restraining ring 14 masks with a short peripheral surface 142 both the exit end 103 of the accumulator roller 10 and also the external circumference of the end plate 121 in order to exclude the danger of the yarn 31 becoming jammed between the yarn restraining ring 14 and the accumulator roller 10 on the one hand, and the end plate 121 on the other hand.

Figure 2:
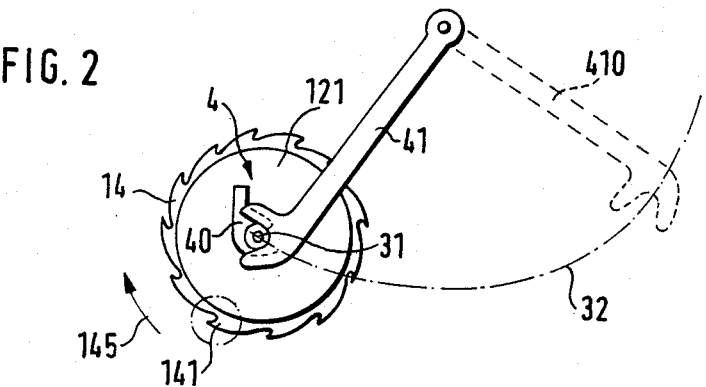
FIG. 2 is a front view of the yarn accumulator of FIG. 1 omitting those elements not essential to the explanation of the restraining element and yarn guide as showing the yarn guide associated with the yarn accumulator.
Figure 3:
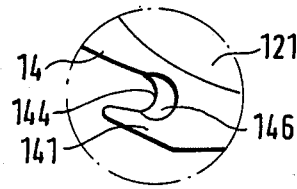
FIG. 3 is a view which illustrates an alternate embodiment of a yarn guide according to the invention.

A part of the yarn restraining ring 14 is illustrated in FIGS. 2 and 3. As will be seen, the yarn restraining ring 14 has at its circumference a plurality of yarn restrainers 141, although a single such yarn restrainer 141 may also possibly be sufficient. The yarn restrainer 141 is, or the yarn restrainers 141 are, constructed radially outwardly open so that a yarn 31 can be brought from the outside into the region of engagement of the yarn restrainer 141. According to FIGS. 2 and 3, the yarn restrainer 141 has the shape of a hook which exhibits an open throat 144 in the drive direction 145 (see FIG. 2) of the yarn restraining ring 14. For protection against wear, this throat 144 is equipped with a ceramic insert 146 according to FIG. 3.

The bearing 100 of the accumulator roller 10 is arranged at an interval from its exit end 103 so that the accumulator roller 10 encloses with a radial wall 104, conjointly with the yarn restraining ring 14, a space 15. In this space 15, a permanent magnet 150 is arranged on the drive shaft 12 at an interval from the radial wall 104 and also from the yarn restraining ring 14. The accumulator roller 10 carries on that side of its radial wall 104 facing the permanent magnet 150 a hysteresis plate 105, whereas the yarn restraining ring 14 carries on its side facing the permanent magnet 150 a hysteresis plate 143. The two slip couplings, constructed as hysteresis couplings, are therefore driven from the shaft 12 through a single permanent magnet 150.

A yarn guide means 4, which consists of two mutually movable yarn guide components 40 and 41, is located in prolongation of the axis 122 of the yarn accumulator 1, formed by the drive shaft 12. According to FIG. 1, the yarn guide component 40 is carried stationary by the maintenance unit 2, whereas the yarn guide component 41 is carried movably by the maintenance unit 2. According to FIG. 2, both yarn guide components 40 and 41 are of bifurcate construction, the yarn guide component 41 being mounted pivotably on the pivot axis 42. By a pivot drive, not shown, the yarn guide component 41 can be transferred from a standby position 410 into the closed position shown in which it engages and grips the yarn 31 following the yarn path 32 and carries it along into the position shown in FIG. 2, in which the yarn 31 is enclosed and guided between the yarn guide components 40 and 41.

A yarn-revolution monitor-device 50, which is associated with the accumulator roller 10, is connected to an impulse counter 5. The yarn joining device 23 is also associated for control with impulse counter 5. The impulse counter 5 is, in turn, associated through a control device 51 for controlling the motor 21 of the auxiliary discharge roller pair 20.

The orifice 240 of a movable suction pipe 24 is arranged in proximity of the yarn path 33 between the discharge roller pair 30 and the yarn accumulator 1. The orifice of a suction pipe 26 is arranged in proximity of the yarn path behind the auxiliary discharge roller pair 20.

A yarn monitor 25 is connected through a control device 250 to the rotary drive means 120 of the yarn accumulator 1 and to a delivery device to feed a sliver required to be separated into individual fibers (not shown) to the spinning apparatus 3. The yarn monitor is located between the yarn joining device 23 and the auxiliary delivery roller pair 20. A yarn deflector device 27 is further located between the yarn monitor 25 and the winding device 6.

The apparatus, the construction of which is described above, operates as follows:

During the normal undisturbed spinning process, the yarn 31 generated in the spinning apparatus 3 is discharged from the latter by the discharge roller pair 30 and fed to the winding device 6. When a yarn breakage occurs, the maintenance unit 2 is summoned in a known manner to the relevant spinning station, where it eliminates the yarn breakage. The attached yarn 31 is afterwards severed with the winding device 6 being stopped. The yarn section extending to the winding device 6 is fed beyond the yarn deflector device 27 to the suction pipe 24 located in the position 241, which thus maintains this yarn section taut. The other yarn section which continues to be delivered by the spinning apparatus 3 is inserted into the auxiliary discharge roller pair 20 and fed to the suction pipe 26 and continuously sucked away there.

At this time, the yarn accumulator 1 is located with its axis 122 at an acute angle α to the yarn path 32 with the exit end 103 located closer to the yarn path 32. The rotary drive means 120 of the yarn accumulator 1, via the shaft 12, the permanent magnet 150 and the hysteresis plates 105 and 143, drives the accumulator roller 10 and the yarn restraining ring 14, which follow this drive movement without obstruction. The rotary speed of drive shaft 12, accumulator roller 10 and yarn restraining ring 14, which initially rotate synchronously, is chosen so that the peripheral speed of the accumulator roller 10 is greater than the speed at which the yarn 31 is discharged from the spinning apparatus 3 by the discharge roller pair 30.

The yarn guide component 41 is now moved out of its standby position 410 into the closed yarn guiding position shown. The yarn section extending to the auxiliary discharge roller pair 20 is enclosed between the yarn guide components 40 and 41. This yarn section then passes into the path of the revolving yarn restrainer 141 which is prevented from further rotation by this yarn section which is maintained taut by the auxiliary discharge roller pair 20 revolving at the same speed as the discharge roller pair 30. However, the accumulator roller 10 revolves with unreduced speed. The yarn section initially continues to be discharged by the auxiliary discharge roller pair 20 and removed by the suction pipe 26 following this auxiliary discharge roller pair 20.

The other yarn section, which extends from the winding device 6 to the orifice 240 of the suction pipe 24 is guided so that it does not enter onto the yarn accumulator 1.

The two yarn sections to be joined are guided mutually parallel in the manner described by the yarn deflector device 27 and the suction pipe 24, or by the yarn guide means 4 and the auxiliary discharge roller pair 20, so that they can be taken up reliably by the yarn joining device 23 in order to join the yarns.

As long as the yarn joining device 23 has not commenced its operation, the yarn restraining ring 14 of the yarn accumulator 1, being driven elastically, that is to say with slip, acts as a yarn compensating element. In fact, if the yarn tension temporarily decreases slightly, the yarn restraining ring 14 rotates in the drive direction and thereby produces a certain wrapping of the accumulator roller 10, which is cancelled again when the yarn tension increases once more—for example, after the completion of the yarn joining.

The yarn joining device 23 thereupon commences its operation while the yarn sections to be joined together must be stopped. The yarn joining device 23 stops the motor 21 via the control device 5, so that the auxiliary discharge roller pair 20 is also stopped. The yarn section which continues to be produced by the spinning apparatus 3 and delivered by the discharge roller pair 30 becomes relaxed so that the yarn restrainer 141, which had already gripped this yarn section previously, now commences to revolve likewise. The yarn length additionally delivered therefore passes onto the accumulator roller 10 and is deposited there. The yarn advance plate 13, in a manner known per se, slides the previous turns from the feed end 101 of the accumulator roller 10 so far towards its exit end 103 in each case, that the new turns can always be deposited between the previous turns and the yarn advance plate 13.

At the start of the accumulation operation, the accumulator roller 10 is slowly decelerated to the yarn delivery speed, which is dictated by the rotary speed of the discharge roller pair 30. The yarn restraining ring 14 with the yarn restrainer 141 then also follows this speed modification because only fluctuating modifications on the exit side of the yarn accumulator 1 lead to relative movements between accumulator roller 10 and yarn restraining ring 14. No yarn is discharged from the yarn accumulator 1 during the thread joining, and since the yarn guide means 4 is located in prolongation of the axis 122 of the yarn accumulator 1, no modifications of tension occur from the yarn exit side of the yarn accumulator 1, and the yarn restraining ring 14 and the accumulator roller 10 rotate synchronously. Since the locus of the yarn feed to the yarn accumulator 1 is a fixed point, the revolutions of the yarn restraining ring 14 constitute a measure of the yarn supply present on the accumulator roller 10. The revolutions of the yarn restraining ring 14 can therefore be used to measure the yarn quantity accumulated on the accumulator roller 10. For this purpose, the yarn-revolution monitor device 50, which substantially comprises a light source and a photoelectric cell in the illustrated construction, or else is constructed as an inductive sensor, is associated with the accumulator roller 10. The yarn-revolution monitoring device 50 therefore detects photoelectrically or inductively the passages of the yarn restrainer(s) 141, as long as the yarn joining device 23 is performing its work.

During the accumulation of yarn 31 on the yarn accumulator 1, an excess of yarn which occurs briefly at the start of operation or the end of operation of the yarn joining device 23 can also be accumulated by the yarn accumulator 1, in which case the yarn restraining ring 14 briefly leads in the drive direction 145 relative to the accumulator roller 10. This stroke is likewise determined by the yarn-revolution monitor-device 50 and registered in the form of impulses by the impulse counter 5.

During the joining by the yarn joining device 23 of the two yarn sections extending to the yarn accumulator 1 and to the winding device 6, the yarn ends extending to the suction pipe 24 and to the suction pipe 26, respectively, are severed and sucked away.

When the yarn joining device 23 has completed its operation, it transmits a corresponding control command, via the control device 51, to the winding device 6, which now recommences its winding operation. As a result of the winding tension, the yarn reserve accumulated on the yarn accumulator 1 is then decreased. The control impulse passed by the yarn joining device 23 to the control device 51 switches over the impulse counter 5 to backward counting. The yarn joining device 23 thus performs the function of a device to determine the yarn revolution direction. When the yarn 31 is discharged from the accumulator roller 10, the yarn restraining ring 14 is rotated counter to the drive direction of the accumulator roller 10 by the discharged yarn 31. Therefore, by a comparison of the impulses emitted during the backward rotation of the yarn restraining ring 14 with the number of impulses emitted during the previous rotation in the drive direction 145, it is possible to determine whether the accumulated yarn reserve has been consumed or not. When the impulse counter has reached the value zero again, it switches itself over so that it counts forward again during the next accumulation process.

Such an apparatus for measuring the state of charge of the accumulator roller 10 by means of an impulse counter has the advantage that it operates independently of the yarn speed, of the yarn thickness, of the rotary speeds at the yarn accumulator and of the dimensions of the yarn accumulator. This also applies irrespective of the accumulation period. The degree of charge of the yarn accumulator 1 is determined solely by the number of revolutions of the yarn restraining ring 14 in the winding direction (=drive direction 145).

In order that the yarn reserve cannot be discharged uncontrollably from the accumulator roller 10, the yarn 31 must always be maintained under tension. This is done by the yarn restraining ring 14 driven via the permanent magnet 150 and the hysteresis plate 143. It is, therefore, possible to discharge the yarn 31 from the accumulator roller 10 only to the extent that tension differences occur in the yarn 31 due to differences in the delivery speed to the yarn accumulator 1 or to differences in the discharge speed from the yarn accumulator 1. The delivery speed is dictated by the rotary speed of the discharge roller pair 30. The discharge speed from the yarn accumulator 1 is dictated initially by the rotary speed of the auxiliary discharge roller pair 20 and afterwards by the winding speed of the winding device 6 or by the absence of a discharge when the yarn joining deivce 23 is operating. However, the tension peaks which occur by variations in the revolution of the yarn restraining ring 14 are immediately absorbed by the elastically operating coupling, permanent magnet 150 and hysteresis plate 143. The yarn restraining ring 14 with its yarn restrainer 141 therefore operates as a restraining element which permits only that quantity of yarn which corresponds to the actual excess speed of the prescribed discharge speed relative to the delivery speed to leave the accumulator roller 10.

After the yarn accumulator 1 has been emptied, the maintenance unit 2 may leave the spinning station and travel to another spinning station in order to perform its operation afresh there.

The apparatus described above with reference to a preferred embodiment can undergo numerous variations depending upon its application.

For example, the rotary drive means 120 need not have its own drive motor, but the shaft 12 may be driven through appropriate reduction gears from any rotating part, suitable for the purpose, of the maintenance unit 2, if provided, or of the machine. Instead of a common permanent magnet 150 to drive the accumulator roller 10 and the yarn restraining ring 14, two separate, mutually physically isolated permanent magnets may also be provided. Then, the drive couplings, constructed as slip couplings, for the accumulator roller 10 and for the yarn restraining ring 14 are entirely mutually independent. The required torques and capacities of the hysteresis couplings (hysteresis plate 143 and permanent magnet 150, also hysteresis plate 104 and permanent magnet 150) should be chosen in accordance with existing conditions and adjusted if necessary by modifying the interval between hysteresis plate 143 or 104 and permanent magnet 150. Separate permanent magnets, adjustable on the drive shaft 12, for the two hysteresis plates 143 and 104 are particularly advantageous in such a case. It is also possible to provide eddy current couplings or fluid couplings instead of hysteresis couplings, in which case it is also conceivable to provide separate drive means, for example, torque motors, for the accumulator roller 10 and for the yarn restraining ring 14.

The yarn restraining ring 14 may also be driven through a friction coupling from the accumulator roller 10, in which case a felt bearing or the like may be adopted as friction coupling. However, a driving of the yarn restraining ring 14 independently of the accumulator roller 10 has the advantage that yarn tension drops occuring on the side beyond the yarn accumulator 1, relative to the yarn path, can also be compensated by the yarn restraining ring 14.

However, the drive means described with reference to FIG. 1 is particularly advantageous, since it is extremely compact, requires no electrical leads extending into the interior of the yarn accumulator 1, and can compensate even yarn tension drops occurring after the yarn accumulator 1.

The yarn restraining ring 14 may likewise be constructed in various ways and also produced of various materials. For instance, it is certainly convenient, although not necessary in all cases, for the yarn restrainer 141 to be constructed as hook, since a particularly rapid take-up of the yarn 31 by the yarn restrainer 141 intersecting the yarn path 34 is ensured in this way. If a yarn restrainer 141 constructed as a hook is provided, then its throat 144 is open in the direction of rotation 145 dictated by the direction of rotation of the rotary drive means 120. By this means, the yarn 31 is retained and guided particularly reliably both during the winding onto the yarn accumulator 1 and also during the unwinding from the yarn accumulator 1.

In this case, the yarn restraining ring 14 may be made of metal and be protected by ceramic inserts 146 in the region of the throats 144 of the yarn restrainers 141. It is also possible to provide, instead of ceramic inserts 146, small wheels, the axis of which is oriented so that the wheels can rotate in the direction of feed of the yarn, whereby the friction is reduced. However, a yarn restraining ring 14 made of plastic is particularly advantageous, because the yarn restraining ring 14 should have the lowest possible moment of inertia due to the need to be able to accelerate the yarn restraining ring 14 rapidly at the start of accumulation. In order to increase the waering resistance of a yarn restraining ring 14, made of plastic, it may exhibit coated, for example, chromium plated, yarn restrainers 141, whereby not only the useful life is prolonged, but simultaneously the slip coefficient between yarn 31 and yarn restraining ring 14 is reduced.

The openable and closeable yarn guide means 4 may also be constructed in various ways. A construction of the yarn guide means 4 which exhibits an eye-shaped configuration with a circular arcuate section which is maintained elastically in abutment with the circular arcuate remainder of the yarn guide means 4 and can be hinged open manually or automatically counter to the action of a spring may be adequate, particularly for yarn accumulators 1 which are used on various types of knitting machines or also on weaving looms. The illustrated construction of a divisible yarn guide means 4 with two mutually separable yarn guide components 40 and 41 is particularly suitable in this case as a yarn conveyor by which the yarn 31 can be moved into the position in prolongation of the axis 122 of the yarn accumulator 1 between the two yarn guide components 40 and 41 by a pivoting movement or also a thrust movement of the movable yarn guide component 41. It is, however, also possible to ensure, by an appropriate arrangement of the yarn accumulator 1 to the yarn path 32, that the yarn 31 intersects the path of the yarn restrainer 141 even without the assistance of a yarn conveyor, and enters the correspondingly controlled yarn guide means 4, possibly with the assistance of the yarn restrainer 141. In the case of a yarn joining device 23 arranged after the yarn accumulator 1 in the direction of feed of the yarn, this yarn guide means 4 may also be arranged so that it is associated not only with the yarn accumulator 1, but also simultaneously with the yarn joining device 23, and presents the yarn 31 to this yarn joining device 23 in the manner necessary for the subsequent operation of the yarn joining device 23.

Where the described device to measure the yarn length is applied to a machine on which it is unnecessary for the yarn accumulator 1 to be movable into the yarn path 32 and out again, a single eye or a plurality of eyes may also be adopted as yarn restrainers(s) 141, in which case the plurality of eyes may also be formed by the interstices between an inwardly open comb ring extending with its teeth into the region of the accumulator roller 10.

It is also not absolutely necessary for a yarn restraining ring 14 to be employed for the measurement of the yarn length. By a suitable choice of materials for accumulator roller and yarn with mutually different reflection behaviour, the yarn itself can also be sensed, so that the accumulated yarn supply can be registered by the impulse counter by means of the directly detected yarn-revolutions in one or the other direction and the revolution difference thereby ascertained.

The device to measure the yarn length therefore possesses significance independently of the possibility of moving the accumulator roller 10 into and out of the yarn path.

The device to determine the yarn-revolution direction may also be constructed in different ways. In the embodiment previously described, it is formed by the yarn-joining device 23, as a function of the operation of which the yarn accumulator 1 increases or decreases the accumulated yarn supply. However, it is also possible to utilize for this purpose the operational state (rotation or stoppage) of the auxiliary discharge roller pair 20. It is also possible to associate with the yarn restraining ring 14 or with the accumulator roller 10 at the exit end 103 a sensor pair which detemine in a manner known per se, in which direction the yarn revolves. Such a sensor pair also permits an accurate determination of the time when the yarn changes its direction of rotation. The switching-on of the winding device 6 can, therefore, be performed very gently. Then, the direction of rotation of the yarn also changes with a delay relative to the end of an operation by a yarn joining device 23, but without the possibility of falsifications occurring in the value stored by the impulse counter.

The described device to measure the accumulated yarn length permits a highly precise measurement. If such precise measurement is not required in other applications of the yarn accumulator, then a charge monitor means may also be omitted. In this case, it is sufficient to switch on, from the yarn joining device 23, a time element which measures the operating period of the yarn joining device 23 and emits, as a function of this period, a signal that the yarn accumulator 1 has now been emptied. The time element may be differently preadjustable for this purpose, so that different times for the yarn joining, different yarn delivery speeds and yarn discharge speeds, different tensioning drafts including adequate safety et cetera may be taken into consideration at this time.

However, even when a charge monitor means is provided, the latter may be constructed in different ways. As described by way of the example of FIG. 1, an impulse counter 50 is provided which determine by forward counting and backward counting whether the accumulator roller 10 is charged or emptied. However, instead, it may be provided for the yarn advance plate 13 to be elastically loaded so that it actuates a switch when turns of yarn are in contact with it and releases this switch by the influence of the loading force when released by turns of yarn—that is to say, when the accumulator roller 10 is empty. Alternatively, one of the entraining slits is prolonged towards the exit end of the accumulator roller 10 and accommodates an arm which is normally pressed outwards beyond the peripheral surface of the accumulator roller 10 by the influence of a spring. However, when a supply of yarn is accumulated on the accumulator roller 10, the yarn turns cover this elastically mounted arm and press it radially inwards counter to the influence of the spring. This elastically mounted arm is part of a switch or actuates the latter, so that a charge monitor means also exists here, as in the example described with reference to the yarn advance plate 13.

Where the yarn accumulator 1 can be associated with a plurality of work stations consecutively, for example, when mounted on a pivot arm, so that the yarn accumulator can be associated with at least two adjacent work stations, or when mounted on a maintenance unit 2 transportable past a plurality of work stations, it is particularly advantageous if the yarn accumulator 1 is re-emptied rapidly and can therefore be withdrawn from this work station again very promptly. For this purpose, the control device 51 shown in FIG. 1 is not only capable of switching on and switching off the motor 21 and the winding device 6, but is furthermore constructed as a speed control means. This speed control means, which, as shown, is connected to the impulse counter 5 (or to a differently constructed charge monitor means and to the yarn joining device 23), receives from the yarn joining device 23, at the start of operation of the latter, a signal to stop the auxiliary discharge roller pair 20 and the winding device 6. The yarn-revolution monitor-device 50 now registers the rotation of the yarn. When the yarn joining process is completed, this is also signaled by the yarn joining device 23 to the control device 51 which now transmits to the winding device the command to discharge the yarn 31 from the accumulator roller 10 at increased speed. Just before the accumulator roller 10 is totally emptied, the impulse counter 5 transmits a corresponding signal to the control device 51, which now reduces the speed of the winding device 6, temporarily increased by 30% for example, to the normal production speed. This occurs stepwise or continuously so that the consumption of the accumulated yarn reserve coincides with the attainment of the normal winding speed.

The control device 51 may include, for example, a conventional digital/analog converter which converts the number stored by the impulse counter 5 into an analog value. This analog value controls the speed of the winding device. As a result of the appropriate construction of the control device 51, a prescribed maximum value is never exceeded. This maximum value is a desired value, which therefore, characterizes the maximum winding speed. The actual value which must be compared with the latter is obtained from the sum of the value characterizing the normal winding speed and of the analog value derived from the impulse counter 5. If this sum (actual value) is lower than the desired value, then it determines the speed of the winding device 6, whereas if this actual value exceeds the desired, the desired value determines the speed of the winding device 6. A gentle speed transition of the winding device 6 to the normal winding speed can be achieved in this manner.

During the yarn joining, the suction pipe 24 retains the yarn section extending to the winding device 6. It is also possible, for this purpose, for the suction pipe 24 to fetch the yarn section only from the winding device 6 or from a transfer device which has taken the yarn from the winding device 6. However, during the yarn joining operation, or at least at the start of this operation, when the yarn-joining device 23 takes up the yarn section, the orifice 240 of the suction pipe 24 assumes the position 241 shown by dashed lines, but then travels into the position shown by a solid line in FIG. 1. In this position, the suction pipe 24 performs the function intercepting the yarn 31 released by the yarn accumulator 1 when it empties, which now temporarily occupies the yarn path 35. This excess yarn is also consumed virtually without appreciable tension fluctuations by the normal tension draft in winding. The quality of the turns on the bobbin is not impaired.

When the yarn joining process has failed, this is determined by the yarn monitor 25. The latter then immediately interrupts the feed of the yarn 31 to the yarn accumulator 1. For this purpose, the yarn monitor is associated for control through the control device 250 with the device to generate (spinning apparatus 3) or to deliver the yarn 31 (discharge device to discharge the yarn from a bobbin, for example, in a yarn-processing or yarn treating machine). The additional delivery of the yarn 31 to the yarn accumulator 1 is therefore prohibited. It is now necessary to free the accumulator roller 10 of its yarn 31 in order to avoid excessive accumulation quantities. This can, of course, be done manually. Instead of this, in the embodiment illustrated, the yarn monitor 25 is additionally connected through the control device 250 to the rotary drive means 120 of the yarn accumulator 1. If a yarn breakage after the yarn joining device 23 is now registered, the additional delivery of the yarn 31 to the yarn accumulator 1 is prohibited. Simultaneously, the direction of rotation of the accumulator roller 10 is reversed by reversing the direction of rotation of the rotary drive means 120 so that the suction pipe 24 can discharge and remove the yarn 31 accumulated on the accumulator roller 10, which generally extends as far as the yarn joining device 23.

The emptying of the yarn accumulator 1 may also be effected in other ways. For example, the yarn guide means 4 has a roller pair (not shown) with a pressure roller which can be raised and which discharges the yarn from the yarn accumulator 1 when a yarn breakage occurs and feeds it to a further suction means, not shown.

When a yarn breakage has occurred, after the yarn accumulator 1 has emptied, a command is given so that the maintenance unit 2 can repeat the unsuccessful attaching process.

As illustrated and explained, the yarn accumulator 1 is located in a position inclined at an acute angle α to the yarn path 32, because a feeding of the yarn 31 to the yarn accumulator 1 can then be performed most simply. However, other arrangements of the yarn accumulator 1 to the yarn path 32 are likewise possible if it is ensured, by appropriate stationary or movable yarn guide means, that the yarn 31 can be brought into a path intersecting the yarn restrainer 141.

An exemplary embodiment of a yarn accumulator 7, which may be constructed both with and also without a yarn catcher 8 is explained below with reference to FIG. 4. In the following description, the reference numerals used in FIG. 1 are again used for elements which are unchanged from that figure.

The yarn accumulator 7, according to FIG. 4, is illustrated in section in the top half of the illustration but in side view in the bottom half of this illustration.

Like the yarn accumulator 1 shown in FIG. 1, the yarn accumulator 7 again has a base 11, by means of which the yarn accumulator 7 is mounted in a suitable manner, for example, in a maintenance unit 2, to continue with the example of an open-end spinning machine. Again a shaft 12, to one end of which the accumulator roller 70 is connected in rotation, is mounted by means of a bearing 111 in the hub 110 of the base 11.

The other end of the drive shaft 12 is connected to a rotary drive means 120 (see FIG. 1, for example, torque motor or other motor with an interposed slip coupling), so that the accumulator roller 70 is driven as a function of the resistance opposed to it by the yarn 31.

In the example illustrated in FIG. 4, the accumulator roller 70 exhibits at its feed end 101 facing the base 11 entraining slits 102, which are however in constrast to the embodiment illustrated in FIG. 1, sealed on the inside of the accumulator roller by an inserted ring 71. The yarn advance plate 13 engaging into these entraining slits 102 is, likewise, differently from the embodiment, according to FIG. 1, mounted on its outside in the envelope 112 of the base by means of a bearing 113.

The accumulator roller 70 exhibits at its exit end 103 an annular bead 72 which merges into a tapered conic frustum 73. Along the entire accumulation length 74, that is to say between the feed end 101 and the exit end 103, the accumulator roller 70 has on its peripheral surface a plurality of uniformly distributed orifices 75, which are constructed as elongate slits in the embodiment illustrated. However, a corresponding number of cylindrical bores, which are distributed over the accumulation length 74 so that the accumulated yarn 31 is always in the region of influence of at least one such orifice 75, may also be adopted. In this case, these orifices 75 are advantageously located in lines, which wrap the accumulator roller 70 helicoidally.

The base 11 is adjoined on the side remote from the accumulator roller 70 by a tubular section 76 into which the suction air connection 77 of a suction air pipe connected to a vacuum source (not shown) leads. The section 76 communicates with the interior space 78 of the accumulator roller 70 through bores 760 in the base 11.

When the yarn accumulator 7 is in service, vacuum which is applied to the suction air connection 77 acts through the bores 760 and the orifices 75 to the outside of the accumulator roller 70 because the interior space of the yarn accumulator is otherwise sealed to the exterior (see ring 71). If yarn 31 is now placed on the accumulation length 74 of the accumulator roller 70 which is driven by a rotary drive means 120 permitting a slip, then the vacuum sucks and firmly retains the yarn 31. If at a later time when the yarn 31 is to be discharged again from the accumulator roller 70, then these orifices 75 and the vacuum influencing the yarn 31 here act as a restraining element for the yarn 31. To intensify this restraining effect of the yarn 31 on the accumulator roller 70, as an additional measure in the exemplary embodiment illustrated, the accumulation length 74 of the accumulator roller 70 is bounded on its exit side 103 by the annular bear 72. This annular bead causes an additional deflection of the yarn 31 and hence additional frictional surfaces for the yarn to be discharged. The restaining effect is better than a construction of such a yarn accumulator 7 wherein the restraining element is formed by orifices 75 subject to suction air, but exhibits no such annular bead 72.

A yarn restrainer 8 is again provided here in order to permit the yarn 31 to be fed automatically to the accumulator roller 70 in the case of such a construction of the yarn accumulator 7. In contrast to the embodiment according to FIG. 1, in which the yarn restrainer 141 can execute a relative movement to the accumulator roller 10, the yarn restrainer 8 is always carried along by the accumulator roller 70 during its rotary movement. So that the yarn restrainer 8 operates only during its catching work, but otherwise does not obstruct the discharge of the yarn from the yarn accumulator 7, it is constructed and mounted in the accumulator roller 70 in such a way that it can be sunk in the accumulator roller 70 and no longer projects beyond the surface of the accumulator roller 70.

Here again, the yarn restrainer 8 must be outwardly open for which purpose yarn catchers constructed as hooks may likewise be adopted, as shown in the example of FIGS. 2 and 3.

According to a structurally simple and therefore preferred embodiment, which is described by way of the example of FIG. 4, a conic frustum 73, the major diameter of which corresponds to the diameter of the annular bead 72 and which tapers towards its free end, is attached on that side of the annular bead 72 remote from the accumulation length 74 of the accumulator roller 70. A bushing 80 to accommodate the yarn restrainer 8, which comprises a restraining pin 81, is mounted in this conic frustum 73 in proximity of the annular bead 72. The restraining pin 81 carries within the bushing 80 a plate 82 against the side of which facing the outside of the conic frustum 73 a compression spring 83 is braced, which is braced in turn against the outer end 84 of the bushing 80. For stroke limitation, a further end 85 of the bushing 80, against which the plate 82 abuts when the inner end of the catch pin 81 is released, is provided on the side facing the interior space 78 of the yarn accumulator 7.

An axially slidable adjusting cone 9, which is guided in the accumulator roller 70, carries a bracing plate 90 which serves on the one hand to brace the accumulator roller 70 and to which, on the other hand, a plurality of drive bolts 91 are attached distributed uniformly over its circumference, which are guided securely against rotation by correspondingly distributed bores 114 in the base 11. The drive bolts 91 are connected at their end remote from the bracing plate 90 to an appropriate stroke drive means (not shown), for example, a stroke magnet, a pneumatically or hydraulically loaded stroke piston, et cetera.

The actual cone 92, which can be made to influence the restraining pin 81 and to release the latter again, by sliding along the drive shaft 12 of the yarn accumulator 7, is located on that side of the bracing plate 90 facing the conic frustum 73. Since the accumulator roller 70 and the drive shaft 12 rotate, whereas the adjusting cone 9 does not rotate, approximate bearings may, of course, be provided between the adjusting cone 9 and accumulator roller 70, on the one hand, and between adjusting cone 9 and drive shaft 12, on the other hand.

When the path of the restraining pin 81 and the yarn path 32 are made to intersect by an appropriate movement of the yarn guide means 4 (FIG. 1) or of the yarn accumulator, by an actuation of the stroke drive means (not shown) through the drive bolts 91, the cone 92 is brought into abutment against the inner end of the restraining pin 81 or, if a plurality of restraining pins 81 are provided, against their inner ends. As a result of this, the restraining pin or pins 81 is or are pushed out of the surface of the conic frustum 73 of the accumulator roller 70 counter to the action of the compression springs 83 associated with them. During the rotation of the accumulator roller 70, the yarn 31 is caught by one of the restraining pins 81 and the winding of the yarn 31 on the yarn accumulator 7 is thereby caused. In the time during which the discharge of the yarn 31 from the yarn accumulator 7 has not yet been interrupted, the yarn 31 is then wound onto the accumulator roller 70 exactly as fast as it is discharged so that there is only a single turn initially.

In order to ensure that even this one turn is not made before the yarn 31 has been stopped in the region after the yarn accumulator 7, the stroke drive means of the adjusting cone 9 is conveniently also actuated from the device which causes the stoppage of the yarn discharge in the region of the yarn joining device 23. Thus, it is provided, where a yarn accumulator 7 is employed, instead of the yarn accumulator 1 in an open-end spinning apparatus according to FIG. 1, that the yarn joining device 23 controls the stroke magnet for the drive bolts 91. When the stroke magnet drops on completion of the operation of the yarn joining device 23, the cone 92 is retracted from the catch pin 81, which now releases the yarn 31. However, the yarn 31 is restrained on the surface of the accumulator roller 70 due to the vacuum acting in the orifices 75, until by the exertion of an increased tensile stress, which the winding device 6 exerts upon the yarn 31, the latter is discharged from the accumulator roller 70 precisely according to requirements.

In a simple embodiment of the device, it is sufficient to keep the wear on the restraining pin 81 within acceptable limits by choosing the shape of its inner end, and by an appropriate choice of material. However, in order to prolong its useful life, it may also be provided for the restraining pin 81 to be secured against rotation, for example, by a noncircular shape of the restraining pin 81 itself or of its plate 82 and appropriate guidance by the bushing 80 or its end 84 and 85. At its inner end, a small wheel 86 is carried which is oriented in the direction of rotation of the accumulator roller 70 and rolls on the cone 90 when the latter enters into contact with the small wheel 86.

The drive of the restraining pin 81 in the radial direction may obviously also be effected otherwise than as shown. For example, the inner end of the restraining pin 81 exhibits a drive foot which is guided in one of two parallel guide tracks in a radial wall (not shown) of the accumulator roller 2. The drive foot of the restraining pin 81 can be transferred from the one guide track into the other by adjustable points. The points may then be actuated mechanically or electromagnetically. The two guide tracks are arranged mutually concentrically and only exhibit points by means of which the drive foot can pass from the inner into the outer guide track. When the drive foot is located in the inner guide track, the restraining pin 81 is lowered in the peripheral wall of the conic frustum 73. When the drive foot is located in the outer track, the catch pin projects beyond the peripheral wall of the conic frustum.

In the case of an embodiment of the yarn accumulator 7, according to FIG. 4, it is in fact also possible in principle to arrange the yarn restrainer 8 at the clyindrical end of the accumulation length 74 of the accumulator roller 70 or on the circumference of the annular bead 72, so that the conic frustum 73 is unnecessary. However, it has been discovered that the arrangement of the catch pin 81 in the conic frustum 73, particularly in proximity of its major diameter, is particularly advantageous. By arranging the yarn accumulator 7 relative to the yarn path 32 so that the envelope line of the conic frustum 73 is located substantially parallel to the yarn path and in the immediate proximity thereof, the yarn 31 can be caught by a relatively short restraining pin 81. Therefore, a relatively short stroke of the adjusting cone 9 is needed even if the yarn guide means 4 is not constructed as a yarn conveyor.

Instead of a sinkable restraining pin 81 in the conic frustum 73, the conic frustum 73 may have on its envelope surface a non controllable yarn restrainer which can be brought into the region of the yarn path 32 by shortening the axial distance between yarn accumulator 7 and yarn guide means 4. In this case, the yarn accumulator 7 or possibly also the accumulator roller 70 alone, is also adjusted relative to a feed station (discharge roller pair 30). It is, therefore, also possible to continue this movement even after the catching of the yarn 31, to enable the yarn 31 to be deposited juxtaposed turn for turn upon the accumulator roller 70 even without the assistance of a yarn advance plate 13 so that the yarnadvance plate 13 may also be omitted.

Whether the accumulator roller 70 still carries yarn turns or is empty can also be determined in a simple manner by means of a yarn charge monitor means exhibiting an impulse counter in the case of an apparatus according to FIG. 4. During the winding of the yarn 31, the accumulated yarn quantity can be measured by the passages of the restraining pin 81, namely in the same manner as was described by way of the example of FIG. 1. During the discharge of the yarn from the accumulator roller 70, the yarn revolutions, which are opposite to those of the annular bead 72, can be counted on the annular bead. This is made possible in the case of an appropriate choice of materials for accumulator roller 70 and yarn 31 with different reflection characteristics.

If, for example on knitting machines, the delivery of the yarn 31 to the yarn accumulator 1 or 7 is interrupted upon the occurrence of a yarn breakage, then the suction pipe 24 may be omitted, whereas the suction pipe 26 is in any case not required on knitting machines.

The auxiliary mechanisms associated with the yarn accumulator 1 or 7 are therefore only present when the yarn accumulator 1 or 7 is used in certain machines or apparatuses, whereas they may be omitted for others. For example, the yarn monitor 25 is not necessary in all applications because, for example, the charge monitor means can interrupt the additional delivery of the yarn 31 to the yarn accumulator 1 or 7 in the case of a yarn breakage after the yarn accumulator 1 or 7. Nevertheless, the yarn accumulator 1 or 7 even then has the advantage that the running or uninterrupted yarn 31 can be applied to the yarn accumulator 1 or 7 and accumulated there at all times, but that on the other hand, the yarn 31 can also be discharged again from the yarn accumulator 1 or 7 without interruption of its yarn path. Consequently, the yarn accumulator 1 or 7 opens up a wealth of fields of application and is not restricted to the exemplary applications mentioned in an open-end spinning station. It may be used in various kinds of knitting machines, in a weaving loom, and may be used in the textile industry wherever it is necessary to compensate temporary yarn tension fluctuations and to accommodate temporarily incident surplus yarn material in an orderly manner in such a way that when the temporarily accumulated yarn quantity is consumed, it can be fed directly to a yarn take-up station. The term "yarn take-up station" is intended here to mean a yarn-processing station, for example, a knitting station of some kind or weaving station, but also a yarn collecting station, for example, the winding device 6.

Further variations of the subject of the invention by the exchange of elements among themselves or by equivalents and combinations thereof lie within the scope of the present invention.

What is claimed is:

1. A yarn accumulator comprising:
   (a) a rotary drive means;
   (b) an accumulator roller driven by said rotary drive means having a rotary axis;
   (c) a feed end formed on one end of said accumulator roller and an exit end formed at a distal end of said accumulator roller;
   (d) a yarn feed station for feeding yarn substantially tangential to said feed end of said accumulator roller;
   (e) a rotatable yarn restraining element carried at said exit end of said accumulator roller;
   (f) said yarn restraining element being rotatable relative to said accumulator roller;
   (g) yarn guide means arranged in prolongation of said rotary axis of said roller accumulator;
   (h) said yarn being unwound from said accumulator roller through said yarn guide and counter to the movement of said yarn restraining element;
   (i) said yarn restraining element including a radially outwardly extending open yarn restrainer for engaging yarn lying in a prescribed path at an angle to said axis of said accumulator roller; and
   (j) said yarn guide means having a standby position and a closed yarn guiding position, said yarn guide being movable for engaging said yarn lying in said prescribed yarn path when moving from said standby position to said closed yarn guiding position causing said yarn in said prescribed path to be caught and deflected by said radially extending open yarn restrainer and wound about said roller accumulator.

2. A yarn accumulator as claimed in claim 1, wherein said accumulator roller has
   (a) an interior space;
   (b) a peripheral surface having a plurality of orifices formed therein which lead into said interior space, said peripheral surface forming said restraining element; and including
   (c) a vacuum source and
   (d) means for connecting said interior space to said vacuum source communicating with said orifices for restraining yarn thereon.

3. A yarn accumulator as claimed in claim 2, wherein said orifices are constructed as longitudinal slits which extend substantially along the total yarn accumulation length of said accumulator roller.

4. A yarn accumulator as claimed in claim 2 wherein the restraining element further includes an annular bead arranged at the exit end of the accumulator roller.

5. A yarn accumulator as claimed in claim 1, further comprising means for axially adjusting said accumulator roller relative to said yarn feed station and to said yarn guide means.

6. A yarn accumulator as claimed in claim 1 including a slip coupling for connection of said rotary drive means with said accumulator roller.

7. A yarn accumulator as claimed in claim 1 wherein said restraining element is formed by a yarn restraining ring, said ring being rotatably drivable relative to said accumulator roller.

8. A yarn accumulator as claimed in claim 7 wherein said yarn restraining ring consists of plastic.

9. A yarn accumulator as claimed in claim 1 including a yarn supply monitor means operatively associated with said accumulator roller for measuring the amount of yarn present on said accumulator roller.

10. A yarn accumulator as claimed in claim 1 including a yarn revolution monitoring device for measuring the number of revolutions of yarn about the exit end of said accumulator roller, a rotation-direction monitor device to determine the yarn revolution direction on said accumulator roller, and an impulse counter operatively connected to said yarn-revolution monitoring device and said rotation-direction monitoring device for receiving signals therefrom, said rotation-direction monitoring device having means for switching from a forward counting mode to a backward counting mode according to the change in the yarn rotation direction.

11. A yarn accumulator as claimed in claim 10, further comprising a yarn restraining ring carried by said accumulator roller, a common drive shaft, a first slip coupling connecting said accumulator roller to said shaft and a second slip coupling connecting said ring to said shaft, said yarn restraining ring being drivable with slip relative to said accumulator roller for the guidance of said yarn, and rotation of said restraining ring being sensed by said yarn revolution monitoring-device.

12. A yarn accumulator as claimed in claim 10, further including a yarn discharge device with which the impulse counter is connected for control purposes.

13. A yarn accumulator as claimed in claim 12 wherein the discharge device is formed by a yarn take-up device arranged after the accumulator roller in the direction of feed of the yarn.

14. A yarn accumulator as claimed in claim 1 having a yarn joining device following the yarn accumulator in the yarn feed direction, said yarn guide means serving as a guide means for both said roller accumulator and said yarn joining device.

15. A yarn accumulator as claimed in claim 10 comprising a yarn take-up device arranged after the accumulator roller in the direction of feed of the yarn and having means for being driven, wherein said yarn-revolution monitoring device is formed by a yarn joining device for joining two yarn sections together, said yarn joining device being arranged between said accumulator roller and said yarn take-up station, said monitoring device being connected for control purposes to said yarn take-up station.

16. A yarn accumulator as claimed in claim 13 including a speed control means connected to said impulse counter means to control the speed of the yarn take-up station as a function of the yarn length present on the accumulator roller.

17. A yarn accumulator as claimed in claim 9, including
   (a) a yarn take-up station;
   (b) a stopping device for stopping said yarn take-up station, said stopping device being connected to said yarn supply monitor for control purposes.

18. A yarn accumulator as claimed in claim 1 wherein said accumulator roller includes at its exit end a radially outwardly open yarn restrainer extending openly and outwardly from said accumulator roller.

19. A yarn accumulator as claimed in claim 18 wherein said accumulator roller is continued beyond its exit end in the form of a tapered conic frustum having an envelope surface on which said yarn restrainer is arranged.

20. A yarn accumulator as claimed in claim 19 wherein said restrainer is arranged in the immediate proximity of the major diameter of the conic frustum.

21. A yarn accumulator as claimed in claim 18 wherein said yarn restrainer is mounted in the accumulator roller so that it may be withdrawn out of operation for catching and restraining yarn.

22. A yarn accumulator as claimed in claim 20, wherein said yarn restrainer is retractable in the peripheral surface of the conic frustum.

23. A yarn accumulator as claimed in claim 21 including means for resiliently loading said yarn restrainer in a direction radially inwards in respect to the accumulator roller, and further including an axially slidable adjusting cone carried within said accumulator roller which can be made to engage an inner end of said yarn restrainer.

24. A yarn accumulator as claimed in claim 23, including
(a) means for guiding and securing said yarn restrainer against rotation in said accumulator roller; and
(b) a small wheel carried on the inner end of said yarn restrainer, said wheel being oriented in a peripheral direction of said accumulator roller for bracing the yarn restrainer against said adjusting cone.

25. A yarn accumulator as claimed in claim 18 wherein said yarn restrainer is part of a yarn restraining ring drivable relative to said accumulator roller.

26. A yarn accumulator as claimed in claim 25 including
(a) a common drive shaft for both said accumulator roller and said yarn restraining ring; and
(b) a slip coupling connecting each of said accumulator roller and said yarn restraining ring to said common drive shaft.

27. A yarn accumulator as claimed in claim 26 wherein both said accumulator roller and said yarn restraining ring each carry a hysteresis plate and a permanent magnet is arranged on the common drive shaft between these two hysteresis plates providing said slip coupling.

28. A yarn accumulator as claimed in claim 14 wherein said yarn restrainer includes a hook having an open throat open in the drive direction.

29. A yarn accumulator as claim in claim 28 wherein said yarn restrainer carries a ceramic insert in said throat.

30. A yarn accumulator as claimed in claim 14 wherein said yarn guide means is constructed as a yarn conveyor which deflects a yarn out of a prescribed yarn path into a yarn path intersecting the path of the revolving yarn restrainer.

31. A yarn accumulator as claimed in claim 30 wherein said yarn guide means consists of a stationary guide and a movable deflecting guide.

32. A yarn accumulator as claimed in claim 1 including a suction pipe having an orifice which is arranged in proximity to the yarn path for the yarn fed to said accumulator roller.

33. A yarn accumulator as claimed in claim 1 having a yarn joining device following the yarn accumulator, a device to generate or deliver a yarn arranged before said accumulator roller wherein a yarn monitor is operatively associated with said device to generate or deliver a yarn for controlling operation of said device, said yarn monitoring device being arranged in a yarn path after the yarn joining device.

34. A yarn accumulator as claimed in claim 32 wherein said yarn monitor is associated for control with the rotary drive means of the accumulator roller, said rotary drive means being reversible in its direction of rotation.

35. A yarn accumulator as claimed in claim 1 for a textile machine with a plurality of work stations, a maintenance unit which travels past these work stations, said yarn accumulator being associated selectively with these work stations, wherein the accumulator roller and a yarn path can be brought to an acute mutual angle so that the exit end of said accumulator roller is closer than its feed end to said yarn path.

36. A yarn accumulator comprising:
(a) a rotary drive means;
(b) an accumulator roller driven by said rotary drive means having a rotary axis;
(c) a feed end formed on one end of said accumulator roller and an exit end formed at a distal end of said accumulator roller;
(d) a yarn feed station for feeding yarn substantially tangential to said feed end of said accumulator roller;
(e) a rotatable yarn restraining element carried at said exit end of said accumulator roller;
(f) yarn guide means arranged in prolongation of said rotary axis of said roller accumulator;
(g) said yarn being unwound from said accumulator roller through said yarn guide and counter to the rotation of said yarn restraining element;
(h) said yarn restraining element including a radially outwardly extending yarn restrainer for engaging yarn lying in a prescribed path in proximity of the path of said revolving yarn restrainer; and
(i) said yarn guide means being adapted to be opened in order to thread-in or thread-out the yarn, and to be closed in order to guide said yarn in a prescribed path during winding-on of yarn about said roller and during unwinding of yarn from said roller.

37. A yarn accumulator comprising:
(a) a rotary drive means;
(b) an accumulator roller driven by said rotary drive means having a rotary axis;
(c) a feed end formed on one end of said accumulator roller and an exit end formed at a distal end of said accumulator roller;
(d) a yarn feed station for feeding yarn substantially tangential to said feed end of said accumulator roller;
(e) a rotatable yarn restraining element carried at said exit end of said accumulator roller;
(f) yarn guide means arranged in prolongation of said rotary axis of said roller accumulator;
(g) said yarn being unwound from said accumulator roller through said yarn guide and counter to the rotation of said yarn restraining element;
(h) said yarn accumulator including a yarn-revolving monitoring device for measuring the number of revolutions of yarn about the exit end of said accumulator roller, a rotation-direction monitor device to determine the yarn revolution direction on said accumulator roller, and an impulse counter operatively connected to said yarn-revolution monitoring device and said rotation-direction monitoring device for receiving signals therefrom and which is switchable from a forward counting mode to a backward counting mode as a function of a change in the yarn rotation direction.

38. A yarn accumulator as claimed in claim 37, further comprising a yarn restraining ring carried by said accumulator roller, a common drive shaft, a first slip coupling connecting said accumulator roller to said shaft and a second slip coupling connecting said ring to said shaft, said yarn restraining ring being drivable with slip relative to said accumulator roller for the guidance of the yarn, and rotation of said restraining ring being sensed by said yarn-revolution monitoring-device.

39. A yarn accumulator as claimed in claim 37, including a yarn discharge device with which the impulse counter is connected for control purposes.

40. A yarn accumulator as claimed in claim 39, wherein the discharge device is formed by a yarn take-up device arranged after the accumulator roller in the direction of feed of the yarn.

41. A yarn accumulator as claimed in claim 37, comprising a yarn take-up device arranged after the accumulator roller in the direction of feed of the yarn, wherein said yarn-revolution monitoring device is formed by a yarn joining device for joining two yarn sections together arranged between said accumulator roller and said yarn take-up station, and monitoring device controlling the drive means of the yarn take-up station.

42. A yarn accumulator as claimed in claim 40, including a speed control means connected to said impulse counter means to control the speed of the yarn take-up station as a function of the yarn length present on the accumulator roller.

43. A yarn accumulator as claimed in claim 37, wherein said impulse counter is associated with a stopping device for stopping a yarn take-up station.

* * * * *